(12) United States Patent
Lee (10) Patent No.: US 11,991,095 B2
(45) Date of Patent: May 21, 2024

(54) NETWORK SYSTEM AND MAPPING DEVICE CAPABLE OF SCALING FABRIC SIZE

(71) Applicant: Accton Technology Corporation, Hsin-Chu (TW)

(72) Inventor: Kuan-Tse Lee, Hsin-Chu (TW)

(73) Assignee: Accton Technology Corporation, Hsin-Chu (TW)

(*) Notice: Subject to any disclaimer, the term of this patent is extended or adjusted under 35 U.S.C. 154(b) by 317 days.

(21) Appl. No.: 17/708,002

(22) Filed: Mar. 30, 2022

(65) Prior Publication Data
US 2022/0321500 A1   Oct. 6, 2022

Related U.S. Application Data

(60) Provisional application No. 63/169,254, filed on Apr. 1, 2021.

(51) Int. Cl.
*H04L 49/15* (2022.01)
*H04L 49/111* (2022.01)
*H04L 49/112* (2022.01)

(52) U.S. Cl.
CPC .......... *H04L 49/111* (2022.05); *H04L 49/112* (2022.05); *H04L 49/15* (2013.01)

(58) Field of Classification Search
CPC ....... H04L 49/111; H04L 49/112; H04L 49/15
See application file for complete search history.

(56) References Cited

U.S. PATENT DOCUMENTS

| | | | | |
|---|---|---|---|---|
| 2007/0253437 A1* | 11/2007 | Radhakrishnan | ....... | G06F 15/16 370/392 |
| 2012/0250679 A1* | 10/2012 | Judge | ..... | H04L 49/15 370/359 |
| 2014/0071982 A1* | 3/2014 | Chandhoke | ..... | G06F 1/14 370/355 |
| 2014/0376546 A1* | 12/2014 | Miller | ..... | H04L 49/25 370/388 |
| 2017/0187614 A1* | 6/2017 | Haramaty | ..... | H04L 49/3045 |
| 2020/0304406 A1* | 9/2020 | Thubert | ..... | H04L 49/1515 |
| 2020/0322838 A1* | 10/2020 | Thubert | ..... | H04W 28/0289 |
| 2021/0288921 A1* | 9/2021 | Levy | ..... | H04L 49/1515 |
| 2023/0171016 A1* | 6/2023 | Lee | ..... | H04J 3/0667 370/503 |

* cited by examiner

*Primary Examiner* — Wutchung Chu
(74) *Attorney, Agent, or Firm* — Winston Hsu (57) ABSTRACT

A network system includes P upper switches, Q lower switches, and a first mapping device. Each upper switch of the P upper switches includes a plurality of upper ports. A group of upper switches selected from the P upper switches includes P1 upper switches. Each lower switch of the Q lower switches includes a plurality of upper ports. The first mapping device includes P1 upper adapter terminals coupled to a part of upper ports of the P1 upper switches, and P1 lower adapter terminals coupled to lower ports of a part of Q lower switches. The first mapping device is used for allocating a plurality of transmitting channels and receiving channels received by each upper adapter terminal to the P1 lower adapter terminals.

15 Claims, 6 Drawing Sheets

NETWORK SYSTEM AND MAPPING DEVICE CAPABLE OF SCALING FABRIC SIZE

CROSS REFERENCE TO RELATED APPLICATIONS

This application claims the benefit of U.S. Provisional Application No. 63/169,254, filed on Apr. 1, 2021. The content of the application is incorporated herein by reference.

BACKGROUND OF THE INVENTION

1. Field of the Invention

The present invention relates to a network system and a mapping device, and more particularly, a network system and a mapping device capable of scaling fabric size.

2. Description of the Prior Art

Currently, scaling up a network fabric size is either to design a modular chassis system with fabric cards and line cards or to design distributed disaggregation chassis with different port counts. The modular chassis design approach can provide satisfactory investment protection with upgraded software and fabric/line cards replacement. However, the cost of the modular chassis is much higher than typical pizza box switches. Therefore, the distributed disaggregation chassis can be used alternatively. However, when the network fabric size is adjusted, re-allocation of switches and re-construction of network topology are very challenging. In other words, the complexity in designing fabric switches with large-port-count for scaling up fabric size purpose may result in cost and nearly impractical without using the modular chassis approach.

In a typical network system built by distributed aggregation chassis (also called DDC network), the fabric size is determined by the spine fabric port count. A 48-ports fabric switch can support twice the fabric size as a 24-ports fabric switch in general. In a 48-port switch, the data path of each port of the 48-port switch must be able to be switched to any other port of the same 48-port switch. To build a highly scalable DDC network, multiple fabric chips with proper interconnection can be used for scaling up the fabric size. However, this approach of chip-to-chip interconnection is hard to implement due to signal integrity loss, especially in driving high-speed (50G-PAM4) long-term signals through board-to-board connectors. Therefore, re-timers on long trace between ports for chip-to-chip interconnection are required. Unfortunately, expensive PCB material, high-speed connectors, and re-timers may increase the cost and system power consumption significantly. Further, in order to satisfy the requirements of each fabric size, corresponding systems must be designed for various forms of chip-to-chip interconnections due to differences in the chip-to-chip interconnections.

Therefore, developing a network system capable of scaling up fabric size with low complexity, low power computation, and high operational flexibility is an important design topic.

SUMMARY OF THE INVENTION

In an embodiment of the present invention, a network system is disclosed. The network system comprises P upper switches, Q lower switches, and a first mapping device. Each of the P upper switches comprises a plurality of upper ports. A group of upper switches selected from the P upper switches comprises P1 upper switches. Each of the Q lower switches comprises a plurality of lower ports. The first mapping device comprises P1 upper adapter terminals coupled to apart of upper ports of the P1 upper switches, and P1 lower adapter terminals coupled to lower ports of a part of the Q lower switches. An upper adapter terminal of the first mapping device comprises PTX1 transmission channels and PRX1 receiving channels. PTX1/P1 transmission channels selected from the PTX1 transmission channels are linked to a lower adapter terminal of the P1 lower adapter terminals by the first mapping device. Remaining transmission channels of the PTX1 transmission channels are partitioned into (P1-1) first transmission groups. The (P1-1) first transmission groups are respectively linked to (P1-1) lower adapter terminals by the first mapping device. PRX1/P1 receiving channels selected from the PRX1 receiving channels are linked to the lower adapter terminal of the P1 lower adapter terminals by the first mapping device. Remaining receiving channels of the PRX1 receiving channels are partitioned into (P1-1) first receiving groups. The (P1-1) first receiving groups are respectively linked to the (P1-1) lower adapter terminals by the first mapping device. P, P1, and Q are positive integers. PTX1 and PRX1 are multiples of P1. P is greater than or equal to P1.

In another embodiment of the present invention, a mapping device is disclosed. The mapping device comprising P1 upper adapter terminals coupled to a part of upper ports of P1 upper switches, and P1 lower adapter terminals coupled to lower ports of apart of Q lower switches. An upper adapter terminal of the P1 upper adapter terminals comprises PTX1 transmission channels and PRX1 receiving channels. PTX1/P1 transmission channels selected from the PTX1 transmission channels are linked to a lower adapter terminal of the P1 lower adapter terminals. Remaining transmission channels of the PTX1 transmission channels are partitioned into (P1-1) transmission groups. The (P1-1) transmission groups are respectively linked to (P1-1) lower adapter terminals. PRX1/P1 receiving channels selected from the PRX1 receiving channels are linked to the lower adapter terminal of the P1 lower adapter terminals. Remaining receiving channels of the PRX1 receiving channels are partitioned into (P1-1) receiving groups. The (P1-1) receiving groups are respectively linked to the (P1-1) lower adapter terminals. P1 and Q are positive integers. PTX1 and PRX1 are multiples of P1.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
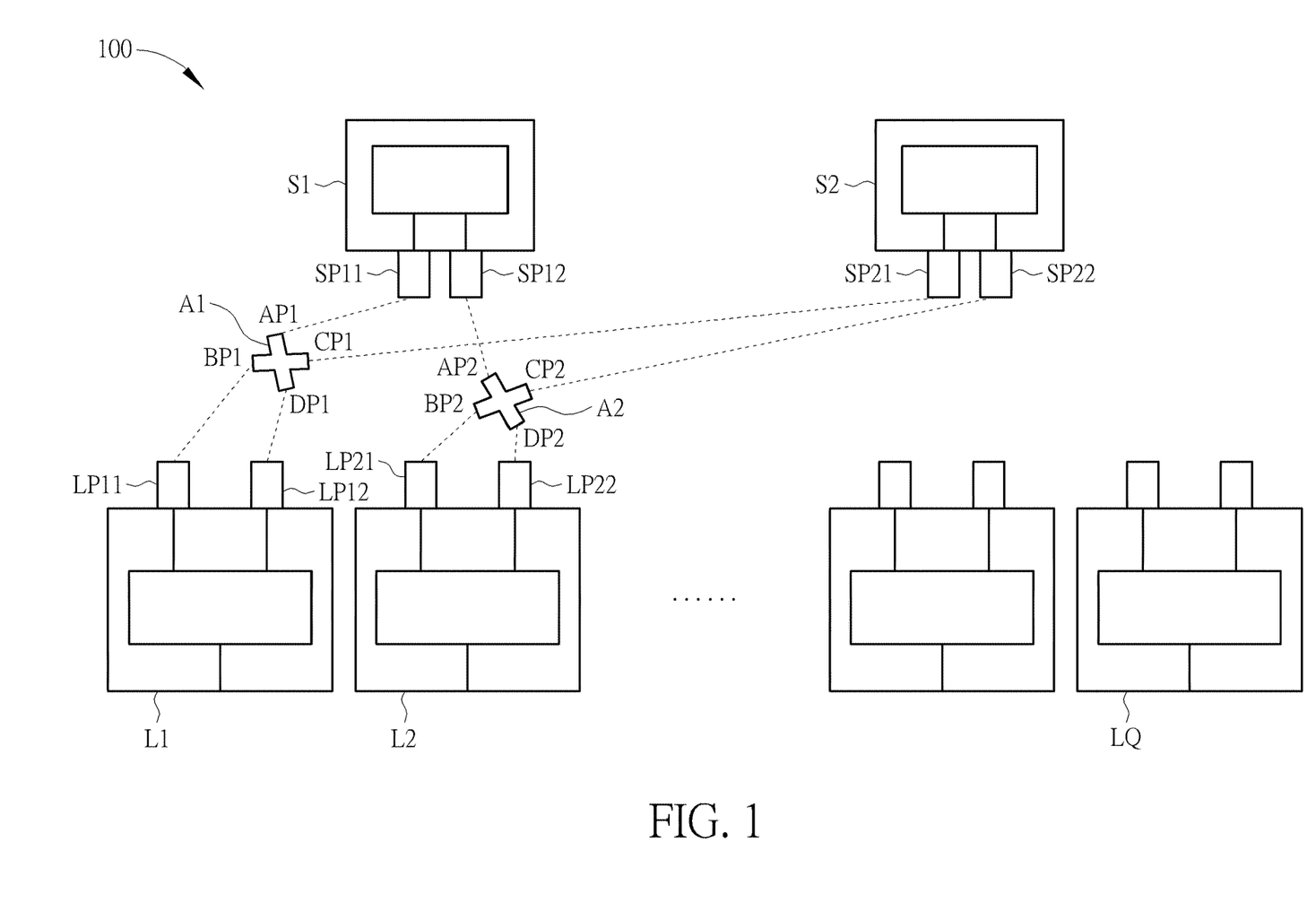
FIG. 1 is a structure illustration of a network system according to an embodiment of the present invention.

FIG. 1 is a structure illustration of a network system 100 according to an embodiment of the present invention. The network system 100 can be applied to the network topology of Spine-Leaf Architecture. For illustration convenience, a structure of Spine-Leaf Architecture is introduced for illustrating the network system 100 hereafter. The network system 100 includes P upper switches, Q lower switches, and a first mapping device A1. Each of the P upper switches includes a plurality of upper ports. Further, the P upper switches can be partitioned into a plurality of groups. A group of upper switches selected from the P upper switches includes P1 upper switches. For example, the group of upper switches includes upper switches S1 and S2 (P1=2). The upper switch S1 has a first upper port (i.e., fabric port) SP11 and a second upper port SP12. The upper switch S2 has a third upper port SP21 and a fourth upper port SP22. Q lower switches L1 to LQ are introduced to the network system 100. Each of the Q lower switches includes a plurality of ports. For example, the lower switch L1 has a plurality of lower ports LP11 and LP12. The lower switch L2 has a plurality of lower ports LP21 and LP22. For scaling a fabric size, the network system 100 can introduce at least one mapping device. Details of the first mapping device A1 and a second mapping device A2 are illustrated below. The first mapping device A1 and the second mapping device A2 can be used for performing crossover lane wiring schemes between the upper switches and the lower switches. In other words, a user can intuitively use a straight cable method for performing the crossover lane wiring schemes between the upper switches and the lower switches by using the first mapping device A1 and the second mapping device A2.

Figure 2:
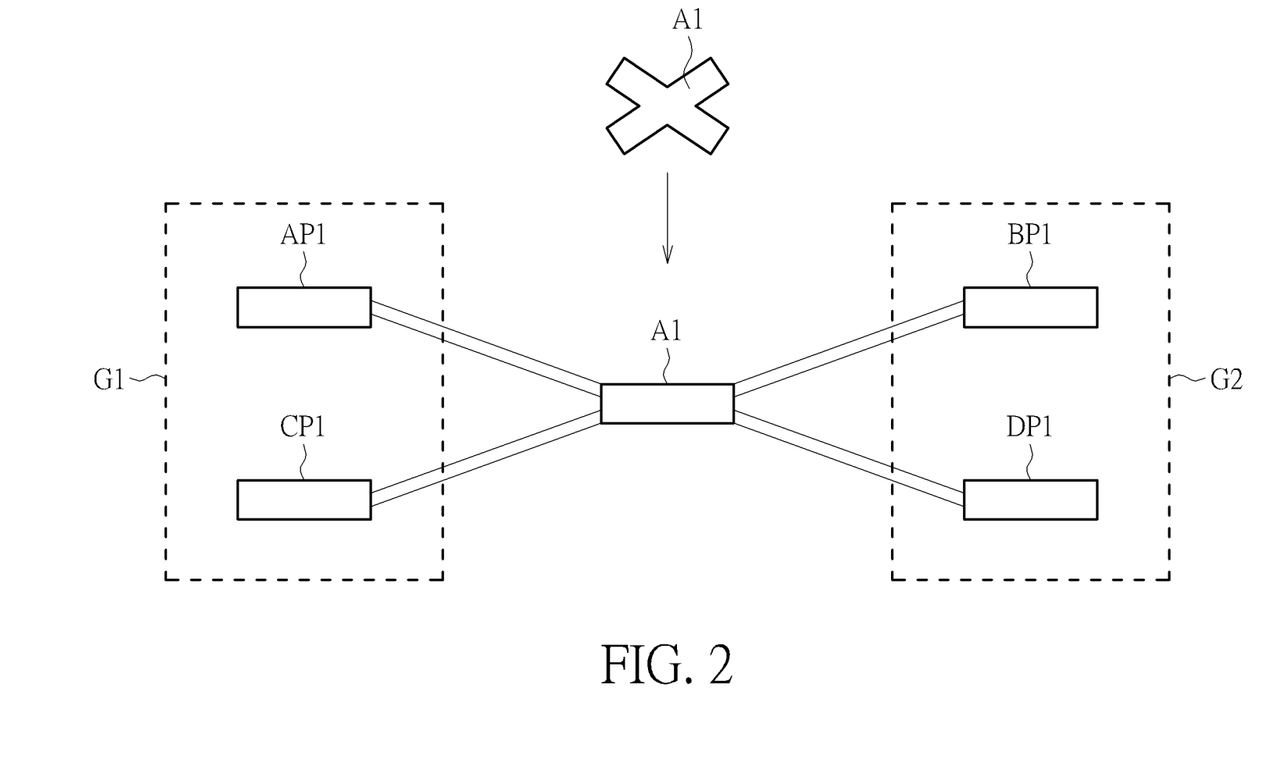
FIG. 2 is a structure illustration of a first mapping device of the network system in FIG. 1.

FIG. 2 is a structure illustration of the first mapping device A1 of the network system 100. For simplicity, the first mapping device A1 with 2×2 dimension is introduced in FIG. 2. In other words, the first mapping device A1 includes 2 upper adapter terminals and 2 lower adapter terminals. In FIG. 2, the first mapping device A1 includes 4 adapter terminals, such as a first upper adapter terminal AP1, a second lower adapter terminal BP1, a third upper adapter terminal CP1, and a fourth lower adapter terminal DP1. The first upper adapter terminal AP1 and the third upper adapter terminal CP1 of the first mapping device A1 can be regarded as an upper adapter group G1. The number of ports of the upper adapter group G1 corresponds to the number of P1 upper switches. For example, when the number of upper switches of the each group of is P1=2, the first upper adapter terminal AP1 and the third upper adapter terminal CP1 are respectively coupled to two upper switches. The second lower adapter terminal BP1 and the fourth lower adapter terminal DP1 of the first mapping device A1 can be regarded as a lower adapter group G2. The number of ports of the lower adapter group G2 corresponds to the number of ports of the upper adapter group G1. In general, the first mapping device A1 can include P1 upper adapter terminals (i.e., for example, the first upper adapter terminal AP1 and the third upper adapter terminal CP1) and P1 lower adapter terminals (i.e., for example, the second lower adapter terminal BP1 and the fourth lower adapter terminal DP1). Further, as shown in FIG. 1 and FIG. 2, the first upper port SP11 of the upper switch S1 is coupled to the first upper adapter terminal AP1 of the first mapping device A1. The third upper port SP21 of the upper switch S2 is coupled to the third upper adapter terminal CP1 of the first mapping device A1. Further, the P1 lower adapter terminals of the first mapping device A1 are coupled to lower ports of a part of the Q lower switches. For example, the second lower adapter terminal BP1 of the first mapping device A1 is coupled to a lower port LP11 of the lower switch L1. The fourth lower adapter terminal DP1 of the first mapping device A1 is coupled to a lower port LP12 of the lower switch L1. Here, P, P1, and Q are positive integers. P is greater than or equal to P1.

Similarly, the second mapping device A2 can be introduced to the network system 100. For simplicity, the second mapping device A2 with 2×2 dimension is introduced in FIG. 1. The second mapping device A2 is similar to the first mapping device A1. The second mapping device A2 includes 4 adapter terminals, such as a fifth upper adapter terminal AP2, a sixth lower adapter terminal BP2, a seventh upper adapter terminal CP2, and an eighth lower adapter terminal DP2. Similarly, the fifth upper adapter terminal AP2 and the seventh upper adapter terminal CP2 of the second mapping device A2 can be regarded as an upper adapter group. The sixth lower adapter terminal BP2 and the eighth lower adapter terminal DP2 of the second mapping device A2 can be regarded as a lower adapter group. In general, the second mapping device A2 can include P1 upper adapter terminals (i.e., for example, the fifth upper adapter terminal AP2 and the seventh upper adapter terminal CP2) and P1 lower adapter terminals (i.e., for example, the sixth lower adapter terminal BP2 and the eighth lower adapter terminal DP2). For example, as shown in FIG. 1, the second upper port SP12 of the upper switch S1 is coupled to the fifth upper adapter terminal AP2 of the second mapping device A2. The fourth upper port SP22 of the upper switch S2 is coupled to the seventh upper adapter terminal CP2 of the second mapping device A2. Further, the P1 lower adapter terminals of the second mapping device A2 are coupled to lower ports of another part of the Q lower switches. For example, the sixth lower adapter terminal BP2 of the second mapping device A2 is coupled to a lower port LP21 of the lower switch L2. The eighth lower adapter terminal DP2 of the second mapping device A2 is coupled to a lower port LP22 of the lower switch L2. By introducing the first mapping device A1 and the second mapping device A2, the user can intuitively use the straight cable method for coupling the upper switches and the lower switches through the first mapping device A1 and the second mapping device A2 for performing the crossover lane wiring schemes between the upper switches and the lower switches.

Figure 3:
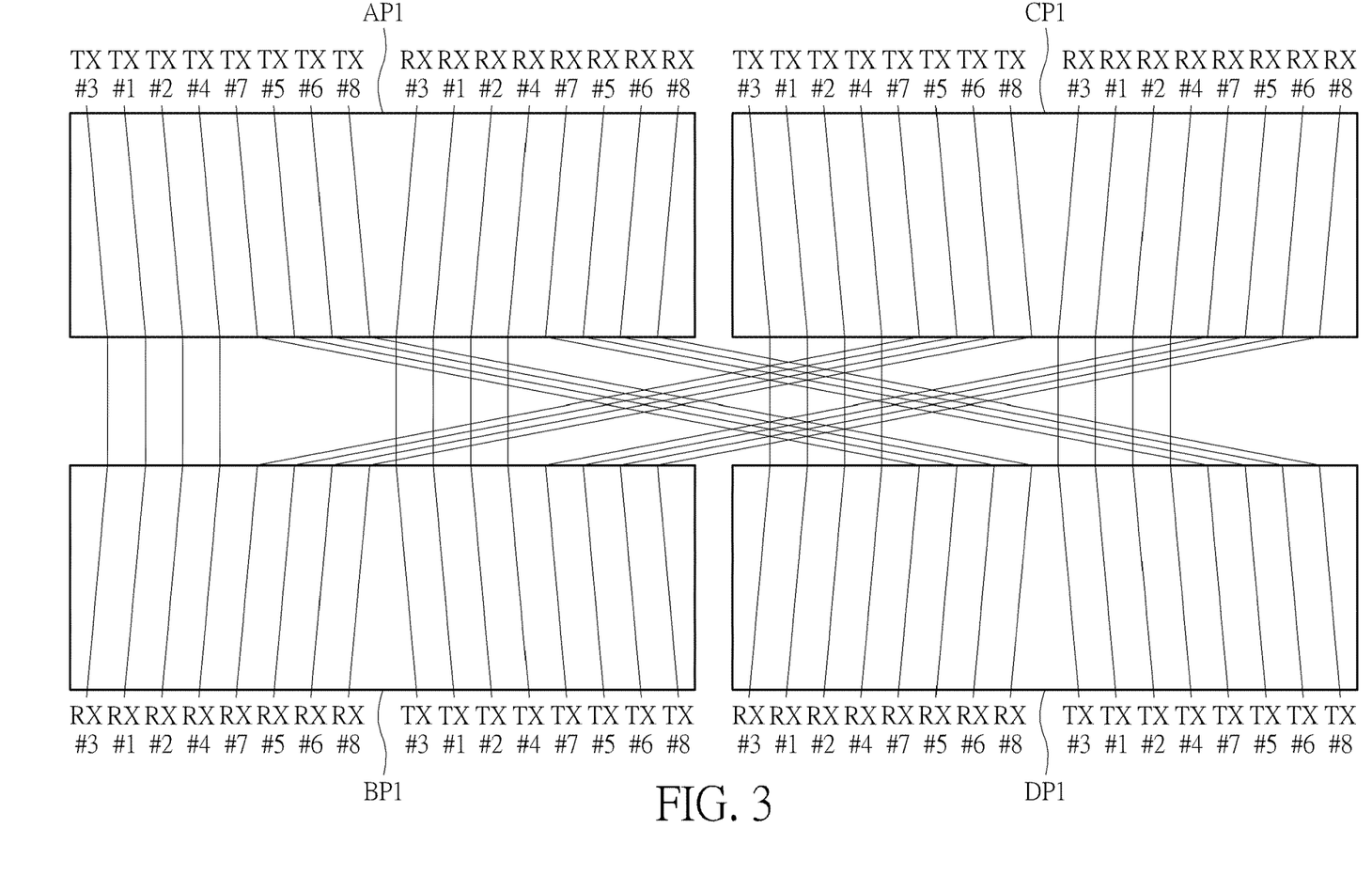
FIG. 3 is an illustration of layout allocations inside the first mapping device of the network system in FIG. 1.

FIG. 3 is an illustration of layout allocations inside the first mapping device A1 of the network system 100. As previously mentioned, the first mapping device A1 includes 4 adapter terminals, such as the first upper adapter terminal AP1, the second lower adapter terminal BP1, the third upper adapter terminal CP1, and the fourth lower adapter terminal DP1. The first upper port S11 of the upper switch S1 is coupled to the first upper adapter terminal AP1 of the first mapping device A1. The third upper port SP21 of the upper switch S2 is coupled to the third upper adapter terminal CP1 of the first mapping device A1. The second lower adapter terminal BP1 of the first mapping device A1 is coupled to the lower port LP11 of the lower switch L1. The fourth lower adapter terminal DP1 of the first mapping device A1 is coupled to the lower port LP12 of the lower switch L1. Further, each upper adapter terminal/lower adapter terminal of the first mapping device A1 includes PTX1 transmission channels and PRX1 receiving channels. For example, each adapter terminal of the first upper adapter terminal AP1, the second lower adapter terminal BP1, the third upper adapter terminal CP1, and the fourth lower adapter terminal DP1 includes transmission channels TX #1 to TX #8, and receiving channels RX #1 to RX #8 (PTX1=PRX1=8). Further, (PTX1/P1) transmission channels selected from the PTX1 transmission channels can be linked to a lower adapter terminal of the P1 lower adapter terminals by the first mapping device A1. Remaining transmission channels of the PTX1 transmission channels can be partitioned into (P1-1) first transmission groups. The (P1-1) first transmission groups are respectively linked to (P1-1) lower adapter terminals by the first mapping device A1. For example, for P1=2, the first upper adapter terminal AP1 includes 8 transmission channels TX #1 to TX #8 and 8 receiving channels RX #1 to RX #8. Transmission channels TX #1 to TX #8 can be partitioned into P1=2 transmission groups. Each transmission group includes (PTX1/P1)=4 transmission channels. For example, transmission channels TX #1 to TX #8 of the first upper adapter terminal AP1 can be partitioned into transmission channels {TX #3, TX #1, TX #2, TX #4} and {TX #7, TX #5, TX #6, TX #8}. The transmission channels {TX #3, TX #1, TX #2, TX #4} of the first upper adapter terminal AP1 can be linked to 4 receiving channels {RX #3, RX #1, RX #2, RX #4} of the second lower adapter terminal BP1. The remaining transmission channels {TX #7, TX #5, TX #6, TX #8} of the 8 transmission channels TX #1 to TX #8 of the first upper adapter terminal AP1 can be linked to 4 receiving channels {RX #7, RX #5, RX #6, RX #8} of the fourth lower adapter terminal DP1. Transmission channels TX #1 to TX #8 of the third upper adapter terminal CP1 can be partitioned into transmission channels {TX #3, TX #1, TX #2, TX #4} and transmission channels {TX #7, TX #5, TX #6, TX #8}. The transmission channels {TX #3, TX #1, TX #2, TX #4} of the third upper adapter terminal CP1 can be linked to 4 receiving channels {RX #3, RX #1, RX #2, RX #4} of the fourth lower adapter terminal DP1. The remaining transmission channels {TX #7, TX #5, TX #6, TX #8} of the 8 transmission channels TX #1 to TX #8 can be linked to 4 receiving channels {RX #7, RX #5, RX #6, RX #8} of the second lower adapter terminal BP1. In FIG. 3, the 8 transmission channels TX #1 to TX #8 of each adapter terminal can be uniformly partitioned into P1 transmission groups. A transmission group of the each adapter terminal can be directly coupled to a corresponding "straight cable" adapter terminal. The remaining (P1-1) transmission group can be respectively coupled to (P1-1) adapter terminal. Therefore, the crossover lane wiring schemes of the first adapter device A1 can be implemented.

Similarly, (PRX1/P1) receiving channels selected from the PRX1 receiving channels can be linked to the lower adapter terminal of the P1 lower adapter terminals by the first mapping device A1. Remaining receiving channels of the PRX1 receiving channels can be partitioned into (P1-1) first receiving groups. The (P1-1) first receiving groups are respectively linked to (P1-1) lower adapter terminals by the first mapping device A1. For example, for P1=2, receiving channels RX #1 to RX #8 of the first upper adapter terminal AP1 can be partitioned into P1=2 receiving groups. Each receiving group includes (PRX1/P1)=4 receiving channels. For example, receiving channels RX #1 to RX #8 of the first upper adapter terminal AP1 can be partitioned into receiving channels {RX #3, RX #1, RX #2, RX #4} and {RX #7, RX #5, RX #6, RX #8}. The receiving channels {RX #3, RX #1, RX #2, RX #4} of the first upper adapter terminal AP1 can be linked to 4 transmission channels {TX #3, TX #1, TX #2, TX #4} of the second lower adapter terminal BP1. The remaining receiving channels {RX #7, RX #5, RX #6, RX #8} of the 8 receiving channels RX #1 to RX #8 of the first upper adapter terminal AP1 can be linked to 4 transmission channels {TX #7, TX #5, TX #6, TX #8} of the fourth lower adapter terminal DP1. In FIG. 3, the 8 receiving channels RX #1 to RX #8 of each adapter terminal can be uniformly partitioned into P1 receiving groups. A receiving group of the each adapter terminal can be directly coupled to a corresponding "straight cable" adapter terminal. The remaining (P1-1) receiving group can be respectively coupled to (P1-1) adapter terminal. PTX1 and PRX1 are multiples of P1. Therefore, the crossover lane wiring schemes of the first adapter device A1 can be implemented.

In other words, transmission channels and receiving channels of the first upper adapter terminal AP1, the second lower adapter terminal BP1, the third upper adapter terminal CP1, and the fourth lower adapter terminal DP1 can be illustrated in Table T1 to Table T4, as shown below.

TABLE T1

| First upper adapter terminal AP1 | Second lower adapter terminal BP1 |
|---|---|
| TX#3 | RX#3 |
| TX#1 | RX#1 |
| TX#2 | RX#2 |
| TX#4 | RX#4 |
| RX#3 | TX#3 |
| RX#1 | TX#1 |
| RX#2 | TX#2 |
| RX#4 | TX#4 |

TABLE T2

| Third upper adapter terminal CP1 | Fourth lower adapter terminal DP1 |
|---|---|
| TX#3 | RX#3 |
| TX#1 | RX#1 |
| TX#2 | RX#2 |
| TX#4 | RX#4 |
| RX#3 | TX#3 |
| RX#1 | TX#1 |
| RX#2 | TX#2 |
| RX#4 | TX#4 |

TABLE T3

| First upper adapter terminal AP1 | Fourth lower adapter terminal DP1 |
|---|---|
| TX#7 | RX#7 |
| TX#5 | RX#5 |
| TX#6 | RX#6 |
| TX#8 | RX#8 |
| RX#7 | TX#7 |
| RX#5 | TX#5 |
| RX#6 | TX#6 |
| RX#8 | TX#8 |

TABLE T4

| Third upper adapter terminal CP1 | Second lower adapter terminal BP1 |
|---|---|
| TX#7 | RX#7 |
| TX#5 | RX#5 |
| TX#6 | RX#6 |
| TX#8 | RX#8 |

TABLE T4-continued

| Third upper adapter terminal CP1 | Second lower adapter terminal BP1 |
|---|---|
| RX#7 | TX#7 |
| RX#5 | TX#5 |
| RX#6 | TX#6 |
| RX#8 | TX#8 |

Similarly, in FIG. 1, the second mapping device A2 has the same structure. An upper adapter terminal (i.e., the fifth upper adapter terminal AP2) of the second mapping device A2 includes PTX2 transmission channels and PRX2 receiving channels. PTX2/P1 transmission channels selected from the PTX2 transmission channels are linked to a lower adapter terminal (i.e., the sixth lower adapter terminal BP2) of the P1 lower adapter terminals by the second mapping device A2. Remaining transmission channels of the PTX2 transmission channels are partitioned into (P1-1) second transmission groups. The (P1-1) second transmission groups are respectively linked to (P1-1) lower adapter terminals (i.e., the eighth lower adapter terminal BP8) by the second mapping device A2. For example, P1=2, one transmission group (4 transmission channels) of the fifth upper adapter terminal AP2 of the second mapping device A2 can be directly coupled to a corresponding "straight cable" adapter terminal, such as the sixth lower adapter terminal BP2. Then, another transmission group (another 4 transmission channels) of the fifth upper adapter terminal AP2 of the second mapping device A2 can be linked to the eighth lower adapter terminal DP2 of the second mapping device A2. Further, PRX2/P1 receiving channels selected from the PRX2 receiving channels are linked to a lower adapter terminal (i.e., the sixth lower adapter terminal BP2) of the P1 lower adapter terminals by the second mapping device A2. Remaining receiving channels of the PRX2 receiving channels are partitioned into (P1-1) second receiving groups. The (P1-1) second receiving groups are respectively linked to (P1-1) lower adapter terminals (i.e., the eighth lower adapter terminal BP8) by the second mapping device A2. For example, P1=2, one receiving group (4 receiving channels) of the fifth upper adapter terminal AP2 of the second mapping device A2 can be directly coupled to a corresponding "straight cable" adapter terminal, such as the sixth lower adapter terminal BP2. Then, another receiving group (another 4 receiving channels) of the fifth upper adapter terminal AP2 of the second mapping device A2 can be linked to the eighth lower adapter terminal DP2 of the second mapping device A2. PTX1 and PRX1 are multiples of P1. Since the operation mechanism of the second mapping device A2 is similar to the operation mechanism of the first mapping device A1. Details of the operation mechanism of the second mapping device A2 are omitted here.

Figure 4:
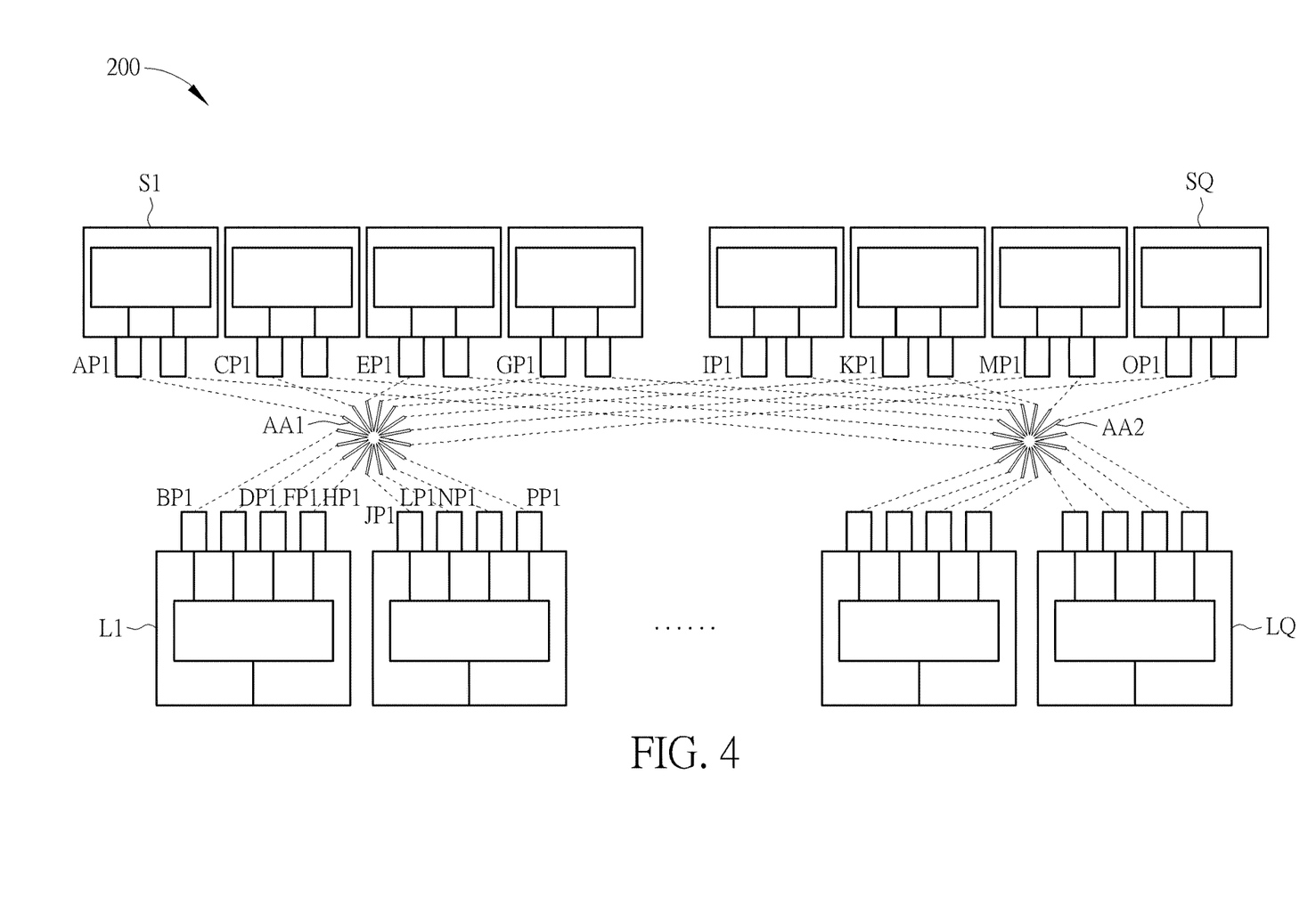
FIG. 4 is an illustration of implementing high dimensional network fabric size according to the network system in FIG. 1.
Figure 5:
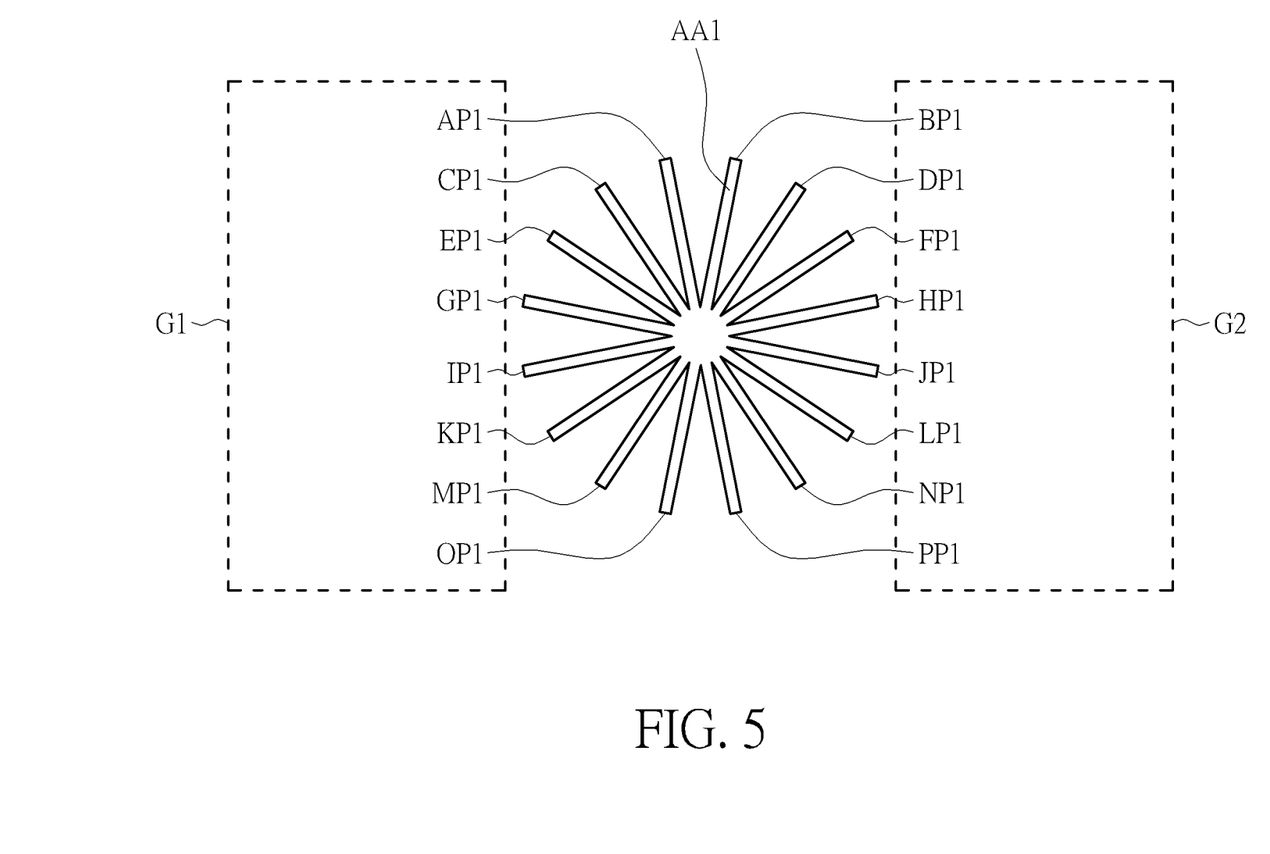
FIG. 5 is a structure illustration of a first mapping device of the network system in FIG. 4.

FIG. 4 is an illustration of implementing high dimensional network fabric size according to the network system 100. For avoiding ambiguity, the network system in FIG. 4 is called as a network system 200 hereafter. FIG. 5 is a structure illustration of a first mapping device AA1 of the network system 200. As previously mentioned, the network system of the present invention can introduce any number of mapping devices for scaling up the network fabric size. In FIG. 4, the first mapping device AA1 has 16 adapter terminals, such as a first upper adapter terminal AP1, a second lower adapter terminal BP1, a third upper adapter terminal CP1, a fourth lower adapter terminal DP1, a fifth upper adapter terminal EP1, a sixth lower adapter terminal FP1, a seventh upper adapter terminal GP1, an eighth lower adapter terminal HP1, a ninth upper adapter terminal IP1, a tenth lower adapter terminal JP1, an eleventh upper adapter terminal KP1, a twelfth lower adapter terminal LP1, a thirteenth upper adapter terminal MP1, a fourteenth lower adapter terminal NP1, a fifteenth upper adapter terminal OP1, a sixteenth lower adapter terminal PP1. Similarly, the 16 adapter terminals can be partitioned into two groups. For example, in the first mapping device AA1, the first upper adapter terminal AP1, the third upper adapter terminal CP1, the fifth upper adapter terminal EP1, the seventh upper adapter terminal GP1, the ninth upper adapter terminal IP1, the eleventh upper adapter terminal KP1, the thirteenth upper adapter terminal MP1, and the fifteenth upper adapter terminal OP1 can be categorized as an upper adapter group G1. Further, in the first mapping device AA1, the second lower adapter terminal BP1, the fourth lower adapter terminal DP1, the sixth lower adapter terminal FP1, the eighth lower adapter terminal HP1, the tenth lower adapter terminal JP1, the twelfth lower adapter terminal LP1, the fourteenth lower adapter terminal NP1, and the sixteenth lower adapter terminal PP1 can be categorized as a lower adapter group G2. The upper adapter group G1 can be linked to 8 upper switches (or say, fabric boxes). The lower adapter group G2 can be linked to a plurality of lower ports of at least one lower switch (or say, edge boxes). Further, as shown in FIG. 1 and FIG. 4, the first mapping device AA1 and a second mapping device AA2 can be used for performing the crossover lane wiring schemes between the upper switches and the lower switches. For example, in the first mapping device AA1, 8 transmission channels can be partitioned into 8 transmission groups (PTX1=8, P1=8). Each transmission group includes (PTX1/P1)=1 transmission channel. Further, 8 transmission groups respectively linked to 8 lower adapter terminals, such as the second lower adapter terminal BP1, the fourth lower adapter terminal DP1, the sixth lower adapter terminal FP1, the eighth lower adapter terminal HP1, the tenth lower adapter terminal JP1, the twelfth lower adapter terminal LP1, the fourteenth lower adapter terminal NP1, and the sixteenth lower adapter terminal PP1. Similarly, in the first mapping device AA1, 8 receiving channels can be partitioned into 8 receiving groups (PRX1=8, P1=8). Further, 8 receiving groups respectively linked to 8 lower adapter terminals, such as the second lower adapter terminal BP1, the fourth lower adapter terminal DP1, the sixth lower adapter terminal FP1, the eighth lower adapter terminal HP1, the tenth lower adapter terminal JP1, the twelfth lower adapter terminal LP1, the fourteenth lower adapter terminal NP1, and the sixteenth lower adapter terminal PP1. Therefore, the first mapping device AA1 and a second mapping device AA2 can be used for performing the crossover lane wiring schemes between the upper switches and the lower switches. The user can intuitively use a straight cable method for performing the crossover lane wiring schemes between the upper switches and the lower switches by using the first mapping device AA1 and the second mapping device AA2, thereby scaling up the network fabric size.

Figure 6:
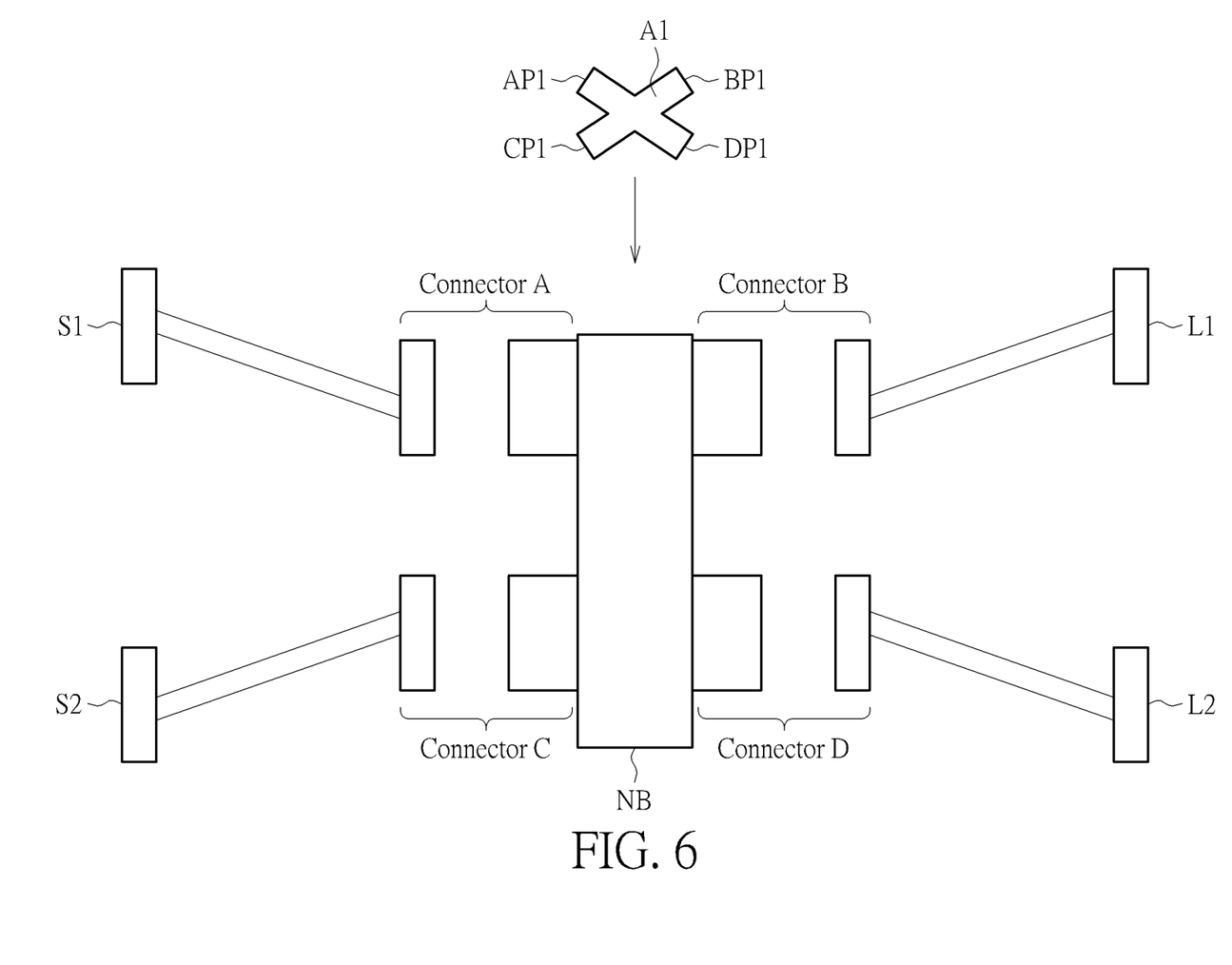
FIG. 6 is an illustration of allocating the first mapping device inside a wire mapping box of the network system in FIG. 1.

FIG. 6 is an illustration of allocating the first mapping device A1 inside a wire mapping box NB of the network system 100. In the network system 100, the first mapping device A1 can be integrated into an external circuit or an electronic device as the wire mapping box NB. Four adapter terminals of the first mapping device A1 (the first upper adapter terminal AP1, the second lower adapter terminal BP1, the third upper adapter terminal CP1, and the fourth lower adapter terminal DP1) respectively correspond to four connectors of the wire mapping box NB, such as a connector A, a connector B, a connector C, and a connector D.

Therefore, the user can easily and intuitively perform the crossover lane wiring schemes between the upper switches S1 to SQ and the lower switches L1 to LQ through the wire mapping box NB.

To sum up, the present invention discloses a network system. A goal of this invention is to reduce circuit layout complexity and the number of connection ports when the network fabric size is increased. In the network system of the present invention, at least one mapping device is introduced between the upper switches and the lower switches. Since the mapping device can perform crossover lane wiring connections, the user can intuitively use a straight cable method for performing crossover lane wiring schemes between the upper switches and the lower switches by using the at least one mapping device, thereby scaling up the network fabric size.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network system, which is capable of scaling fabric size, comprising:
   P upper switches, wherein each of the P upper switches comprises a plurality of upper ports, and a group of upper switches selected from the P upper switches comprises P1 upper switches;
   Q lower switches, wherein each of the Q lower switches comprises a plurality of lower ports; and
   a first mapping device comprising:
      P1 upper adapter terminals coupled to a part of upper ports of the P1 upper switches; and
      P1 lower adapter terminals coupled to lower ports of a part of the Q lower switches;
   wherein an upper adapter terminal of the first mapping device comprises PTX1 transmission channels and PRX1 receiving channels, (PTX1/P1) transmission channels selected from the PTX1 transmission channels are linked to a lower adapter terminal of the P1 lower adapter terminals by the first mapping device, remaining transmission channels of the PTX1 transmission channels are partitioned into (P1-1) first transmission groups, and the (P1-1) first transmission groups are respectively linked to (P1-1) lower adapter terminals by the first mapping device;
   wherein (PRX1/P1) receiving channels selected from the PRX1 receiving channels are linked to the lower adapter terminal of the P1 lower adapter terminals by the first mapping device, remaining receiving channels of the PRX1 receiving channels are partitioned into (P1-1) first receiving groups, the (P1-1) first receiving groups are respectively linked to the (P1-1) lower adapter terminals by the first mapping device; and
   wherein P, P1, and Q are positive integers, PTX1 and PRX1 are multiples of P1, and P>=P1.

2. The system of claim 1, wherein the first mapping device partitions the PTX1 transmission channels into P1 first transmission groups, each of the P1 first transmission groups comprises (PTX1/P1) transmission channels, and the first mapping device respectively links the P1 first transmission groups to the P1 lower adapter terminals of the first mapping device through the upper adapter terminal.

3. The system of claim 2, wherein transmission channels of a first transmission group are different from transmission channels of another first transmission group, and any two first transmission groups are respectively linked to two different lower adapter terminals by the first mapping device.

4. The system of claim 1, wherein the first mapping device partitions the PRX1 receiving channels into P1 first receiving groups, each of the P1 first receiving groups comprises (PRX1/P1) receiving channels, and the first mapping device respectively links the P1 first receiving groups to the P1 lower adapter terminals of the first mapping device through the upper adapter terminal.

5. The system of claim 4, wherein receiving channels of a first receiving group are different from receiving channels of another first receiving group, and any two first receiving groups are respectively linked to two different lower adapter terminals by the first mapping device.

6. The system of claim 1, further comprising:
   a second mapping device comprising:
      P1 upper adapter terminals coupled to another part of upper ports of the P1 upper switches; and
      P1 lower adapter terminals coupled to lower ports of another part of the Q lower switches;
   wherein an upper adapter terminal of the second mapping device comprises PTX2 transmission channels and PRX2 receiving channels, (PTX2/P1) transmission channels selected from the PTX2 transmission channels are linked to a lower adapter terminal of the P1 lower adapter terminals by the second mapping device, remaining transmission channels of the PTX2 transmission channels are partitioned into (P1-1) second transmission groups, and the (P1-1) second transmission groups are respectively linked to (P1-1) lower adapter terminals by the second mapping device; and
   wherein (PRX2/P1) receiving channels selected from the PRX2 receiving channels are linked to the lower adapter terminal of the P1 lower adapter terminals by the second mapping device, remaining receiving channels of the PRX2 receiving channels are partitioned into (P1-1) second receiving groups, the (P1-1) second receiving groups are respectively linked to the (P1-1) lower adapter terminals by the second mapping device, and PTX1 and PRX1 are multiples of P1.

7. The system of claim 6, wherein the second mapping device partitions the PTX2 transmission channels into P1 second transmission groups, each of the P1 second transmission groups comprises (PTX2/P1) transmission channels, and the second mapping device respectively links the P1 second transmission groups to the P1 lower adapter terminals of the second mapping device through the upper adapter terminal.

8. The system of claim 7, wherein transmission channels of a second transmission group are different from transmission channels of another second transmission group, and any two second transmission groups are respectively linked to two different lower adapter terminals by the second mapping device.

9. The system of claim 6, wherein the second mapping device partitions the PRX2 receiving channels into P1 second receiving groups, each of the P1 second receiving groups comprises (PRX2/P1) receiving channels, and the second mapping device respectively links the P1 second receiving groups to the P1 lower adapter terminals of the second mapping device through the upper adapter terminal.

10. The system of claim 9, wherein receiving channels of a second receiving group are different from receiving channels of another second receiving group, and any two second receiving groups are respectively linked to two different lower adapter terminals by the second mapping device.

11. A mapping device comprising:
P1 upper adapter terminals coupled to a part of upper ports of P1 upper switches; and
P1 lower adapter terminals coupled to lower ports of a part of Q lower switches;
wherein an upper adapter terminal of the P1 upper adapter terminals comprises PTX1 transmission channels and PRX1 receiving channels, (PTX1/P1) transmission channels selected from the PTX1 transmission channels are linked to a lower adapter terminal of the P1 lower adapter terminals, remaining transmission channels of the PTX1 transmission channels are partitioned into (P1-1) transmission groups, and the (P1-1) transmission groups are respectively linked to (P1-1) lower adapter terminals; and
wherein (PRX1/P1) receiving channels selected from the PRX1 receiving channels are linked to the lower adapter terminal of the P1 lower adapter terminals, remaining receiving channels of the PRX1 receiving channels are partitioned into (P1-1) receiving groups, the (P1-1) receiving groups are respectively linked to the (P1-1) lower adapter terminals, P1 and Q are positive integers, and PTX1 and PRX1 are multiples of P1.

12. The mapping device of claim 11, wherein the PTX1 transmission channels are partitioned into P1 transmission groups, each of the P1 transmission groups comprises (PTX1/P1) transmission channels, and the P1 transmission groups are respectively linked to the P1 lower adapter terminals through the upper adapter terminal.

13. The mapping device of claim 12, wherein transmission channels of a transmission group are different from transmission channels of another transmission group, and any two transmission groups are respectively linked to two different lower adapter terminals.

14. The mapping device of claim 11, wherein the PRX1 receiving channels are partitioned into P1 receiving groups, each of the P1 receiving groups comprises (PRX1/P1) receiving channels, and the P1 receiving groups are respectively linked to the P1 lower adapter terminals through the upper adapter terminal.

15. The mapping device of claim 14, wherein receiving channels of a receiving group are different from receiving channels of another receiving group, and any two receiving groups are respectively linked to two different lower adapter terminals.

* * * * *